(12) United States Patent
Paque

(10) Patent No.: US 12,521,776 B2
(45) Date of Patent: *Jan. 13, 2026

(54) CLEANING AND DEPOLLUTING OF FIBRES ORIGINATING FROM USED CIGARETTE BUTTS BY CONTACTING WITH A SUPERCRITICAL FLUID AND RECYCLING OF THE DEPOLLUTED FIBRES

(71) Applicant: Julien Paque, Berthecourt (FR)

(72) Inventor: Julien Paque, Berthecourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,946

(22) Filed: Jul. 3, 2024

(65) Prior Publication Data
US 2024/0352672 A1 Oct. 24, 2024

Related U.S. Application Data

(63) Continuation of application No. 17/754,782, filed as application No. PCT/FR2020/051880 on Oct. 19, 2020, now Pat. No. 12,065,781.

(30) Foreign Application Priority Data

Oct. 22, 2019 (FR) ..................................... 1911822
Jan. 28, 2020 (FR) ..................................... 2000806

(51) Int. Cl.
*B09B 3/80* (2022.01)
*B01D 11/02* (2006.01)
*B09B 3/35* (2022.01)
*B09B 3/60* (2022.01)
*D21C 5/02* (2006.01)

(52) U.S. Cl.
CPC ............ *B09B 3/80* (2022.01); *B01D 11/0203* (2013.01); *B01D 11/0288* (2013.01); *B09B 3/35* (2022.01); *D21C 5/022* (2013.01); *B09B 3/60* (2022.01)

(58) Field of Classification Search
CPC .................................. D21C 5/022; D21C 5/00
See application file for complete search history.

(56) References Cited

U.S. PATENT DOCUMENTS 4,308,200 A * 12/1981 Fremont ............ B01D 11/0203
162/63
5,328,934 A * 7/1994 Schiraldi .................. C08J 11/06
536/127
5,504,119 A 4/1996 Hopkins, Jr.
(Continued)

FOREIGN PATENT DOCUMENTS

EP 0595184 A1 5/1994
FR 3066128 A1 11/2018

OTHER PUBLICATIONS

Smook, Handbook for Pulp and Paper Technologists, 1992, Angus Wilde Publications, 2nd edition, chapter 11. (Year: 1992).*
(Continued)

*Primary Examiner* — Anthony Calandra
(74) *Attorney, Agent, or Firm* — Tutunjian & Bitetto, P.C

(57) ABSTRACT

The present invention concerns a facility for cleaning cigarette butts, including a treatment tank configured to treat the cigarette butts in order to extract therefrom fibres to be depolluted, and depollution means configured to depollute the fibres by placing them in contact with a fluid in the supercritical state, referred to as supercritical fluid.

14 Claims, 9 Drawing Sheets

(56) References Cited

U.S. PATENT DOCUMENTS

| | | | |
|---|---|---|---|
| 7,560,059 B2 * | 7/2009 | Burich ............... | B01D 11/0288 |
| | | | 131/96 |
| 12,065,781 B2 * | 8/2024 | Paque ................ | B01D 11/0203 |

OTHER PUBLICATIONS

Teixeira et al., Process development for cigarette butts recycling into cellulose pulp, 2017, Waste Management, 60, p. 140-150 (Year: 2017).*

List of Patents or Patent Applications Treated as Related dated Jul. 3, 2024, 7 pages.

Derwent Summary of CN-104016884-A by Chan et al., Sep. 3, 2014 (Year: 2014).

Derwent Summary of CN-101664228-A by Liu et al., Mar. 10, 2010 (Year: 2010).

International Search Report from PCT/FR2020/051880 dated Feb. 15, 2021, 2 pgs.

* cited by examiner

CLEANING AND DEPOLLUTING OF FIBRES ORIGINATING FROM USED CIGARETTE BUTTS BY CONTACTING WITH A SUPERCRITICAL FLUID AND RECYCLING OF THE DEPOLLUTED FIBRES

CROSS REFERENCE TO RELATED APPLICATIONS

This application is a Continuation of U.S. patent application Ser. No. 17/754,782 filed on Apr. 12, 2022, which is a U.S. National Stage of PCT/FR2020/051880 filed on Oct. 19, 2020 and which claims the priority benefit of French patent application FR1911822 filed on Oct. 22, 2019 and FR2000806 filed on Jan. 28, 2020.

TECHNICAL FIELD

The present invention relates to the field of cleaning cigarette butts, and more particularly cleaning and depollution of fibres originating from the filters of smoked cigarette butts.

One of the objectives of the present invention is to reduce the impact of smoked cigarette butts on the environment by cleaning/depolluting the fibres derived from cigarette butts and by recycling these fibres by manufacturing eco-designed products.

Thus, the object of the present invention relates to a cleaning method and installation using the supercritical fluid technology to depollute the fibres originating from the filters of smoked cigarette butts. The objective is to extract the toxic substances accumulated during the combustion, making cigarette butts hazardous, in order to purify the fibre of the cellulose acetate filter to recycle it.

The object of the present invention also relates to the recycling and reuse of the depolluted fibres obtained upon completion of such a cleaning.

The present invention will find many advantageous applications by providing both manufacturers and communities with a technology for depolluting cigarette butts that is simple to implement and environmentally friendly.

PRIOR ART

It is known that, once the cigarettes have been smoked, cigarette butts are classified as hazardous wastes under the properties HP6 (acute toxicity) by calculation and HP 14 (ecotoxicity) by ecotoxicity tests.

The nicotine concentration in the butt is the main element at the origin this classification.

Besides this toxicity, cigarette butts represent one of the most important wastes in the world with more than 4,300 billion cigarette butts discarded each year in the nature; this represents, for illustration, nearly 40% of the wastes present in the oceans.

It should be noted herein that a cigarette butt decomposes in nature after about 15 years; during this period, the cigarette butt alone pollutes up to 500 litres of water.

For these reasons, the recycling of cigarette butts has become a real ecological and environmental issue.

However, despite this proven toxicity and alarming numbers, the Applicant notices that very few means have been deployed so far for the implementation of the recycling of cigarette butts, for technical, financial and/or ecological/environmental reasons.

The document FR 1754267 A1 is known in particular, which relates to the recycling of cigarette butts. In this document, recycling comprises an essentially water-based cleaning step.

The document U.S. Pat. No. 5,504,119 A is also known, which relates to the recycling of wastes originating from the manufacture of cigarettes; in this document, a water-based cleaning step is also used.

Cigarette butt depollution techniques involving water-based cleaning (by soaking, spraying, wiping, etc.) necessarily require an additional stage of treating and filtering the polluted water used for cleaning.

This makes the process expensive and tedious.

The Applicant further believes that some toxic substances present in cigarette butts cannot dissolve in water, so that the performances associated with this type of technology are not satisfactory.

Other technologies are proposed for recycling cigarette butts like that one proposed in the document WO 2019167054 A1 which proposes a recycling of cigarette butts using natural absorbents such as soil to clean the fibre of the cigarette butts and manufacture menstrual tampons; such a document aims primarily to improve health conditions in underprivileged countries.

Yet, the technical teaching of this document does not apply to cleaning and depollution of cigarette butts.

After extensive researches on the subject, the Applicant believes that to date there is no reliable and efficient solution ensuring cleaning and depollution on a large scale and at a lower cost to clean and depollute cigarette butts in order to recycle the fibres and in particular the cellulose acetate fibres.

SUMMARY OF THE INVENTION

The present invention aims to improve the above-described situation.

More particularly, the present invention aims to overcome at least one of the different drawbacks mentioned above by providing an innovative cleaning and depollution technique involving bringing said cigarette butts into contact with a pressurised dense fluid, and in particular a fluid in the supercritical state.

To this end, the object of the present invention relates, according to a first aspect, to a method for cleaning cigarette butts comprising the following steps:
  a treatment of the butts to extract therefrom fibres to be depolluted; and
  a depollution of the fibres to be depolluted by bringing these into contact with a pressurised dense fluid, preferably a fluid in the supercritical state, called supercritical fluid.

It should be understood herein that the cleaning according to the present invention consists in cleaning a consumed cigarette butt; in other words, cleaning relates to the filter of the cigarette butt once the cigarette has been smoked.

As indicated in the preamble, the butt of the smoked cigarette has a high nicotine concentration; it is this nicotine that represents herein the main toxic element and it is therefore this nicotine that should be cleaned to depollute the fibre in order to reuse it.

Bringing a pressurised dense fluid, preferably a supercritical fluid, into contact with the fibres to be depolluted allows extracting from said fibres most, and even all, of the toxic substances and odours accumulated in the cigarette filters classifying this fibre as toxic.

The pressurised dense fluid (preferably a fluid brought to the supercritical state) acts as a powerful solvent, in particular for organic compounds comprising contaminants and pollutants.

Such an extraction of the toxic substances and odours accumulated in the cigarette filters by a pressurised dense fluid technology (and in particular supercritical fluid) enables a depollution of the fibres; after depollution, these fibres become clean and could be reused for new materials and/or other applications.

Such depolluted fibres are valued in particular for their thermal and/or acoustic properties, their filtering capacities and/or their mechanical properties.

The use of a pressurised dense fluid or a supercritical fluid is advantageous in that it does not require any post-treatment after depollution, in contrast with water-based cleaning techniques which require a treatment of the contaminated cleaning water.

Afterwards, the switch of the fluid from a pressurised dense state, preferably a supercritical state, into a gaseous state enables the fluid to release the contaminants automatically so that it could be used again and continuously recycled. Thus, cleaning generates very little effluents and is carried out in a closed circuit. For example, the depollution of 30 litres of fibres will generate only 0.1 litre of effluent to be treated representing the concentrate of the extracted toxic substances. This ratio is very interesting and allows applying this method on a large scale.

Afterwards, the fibre of the cigarette butts thus depolluted could be transformed into a semi-finished or finished product in different forms to become an eco-designed material that could be used in several fields. It should be understood that according to the field of application, the level of cleaning and purification of the fibre could vary according to the requirements and standards applied to the fields.

In an advantageous embodiment, the method according to the present invention comprises an initial cigarette butt collection phase during which cigarette butts are collected.

Such a collection may be carried out by individuals, associations, communities, companies and/or manufacturers, in particular manufacturers operating in the field of cigarette manufacturing.

Thus, such a collection could be organised on both local and national levels.

Advantageously, the fibres of the cigarette butts comprise cellulose acetate fibres. The reuse of these cellulose acetate fibres, once depolluted, is valued for applications such as:
- textile clothing items (insulating coat padding, insulating cushioning, sewing threads, fabrics, wool to be used in the creation of textile-based clothing or objects: mattress, cushion, duvet, hat, headwear, handbag . . . );
- thermal and/or sound insulation materials (building, electronics, automotive: lithium battery insulator for electric vehicles, aeronautics, shipbuilding, etc.);
- filtering materials (liquid, gas, etc.); —materials for outdoor mulching/geotextile: fabric, plate, etc. (the depolluted material becomes a biodegradable natural fibre that could be used in nature (at the feet of trees for example, etc.).

These materials are made in the form of fibrous plates or bulk fibres in accordance with the standards of the considered field.

It is also valued in the plastics industry in order to create new eco-designed solid materials with or without mixing.

In an advantageous embodiment, the fibres to be cleaned are introduced into a cleaning chamber. Preferably, this is done during the depollution phase before contacting.

Preferably, such a chamber is in the form of an enclosure such as an autoclave.

Advantageously, during the depollution phase, the fluid is compressed up to a determined so-called supercritical pressure and is heated up to a so-called supercritical temperature, said supercritical pressure and temperature being determined according to the fluid.

Preferably, the supercritical pressure is comprised between 0 and 2,000 bars, preferably between 50 and 350 bars, preferably between 280 and 320 bars.

Preferably, the supercritical temperature is comprised between 0° and 400° Celsius, preferably between 15° and 80° Celsius.

Thus, one of the aspects of the present invention is to provide an effective depollution by setting in particular the pressure and temperature parameters in order to bring the fluid into a supercritical state that is powerful and solvent enough to eliminate (extract) the toxic substances and odours present in the cigarette fibres, after combustion of the tobacco.

The extraction performance of the substances depends on the fields of application considered for the recovery of the fibre. It should be understood that the parameters associated with pressure and temperature could change according to the results of required fibre purity.

Advantageously, the fluid is selected from among: carbon dioxide; some organic liquids such as methanol or ethanol; water; Tetrafluoroethane; light alkanes having for example 1 to 5 carbon atoms, such as methane, propane, butane, isobutane and pentane; dihydrogen monoxide; alkenes like ethylene and propylene.

All these fluids could be used as a pressurised dense fluid, in the subcritical (wet oxidation) or supercritical state.

In an advantageous embodiment of the present invention, the fluid selected for the depollution phase is carbon dioxide. It is preferably provided that, in this embodiment, the supercritical temperature is higher than or equal to 31° Celsius and the supercritical pressure is higher than or equal to 73.85 bars.

The use of carbon dioxide as a fluid is advantageous in that it allows depolluting a waste such as a cigarette butt using another waste emitted in very large amounts by industries (carbon dioxide).

The temperature higher than or equal to 31° Celsius) and pressure (pressure higher than or equal to 73.85 bars) conditions to bring the dioxide into the supercritical state are satisfactory and could be reached without difficulty in an enclosure such as an autoclave.

Of course, a person skilled in the art can select other fluids and/or other pressure and/or temperature parameters for this depollution operation.

It should be understood herein that the degree of extraction and the transport capacities of the fluid could vary by acting on these temperature and pressure parameters. Through this technology, we have a solubiliser fluid with an adjustable power, in particular contaminants to be extracted from the fibre derived from the filter.

Advantageously, a co-solvent is added to the fluid to extract undesired organic substances from the fibres, while preserving the quality and the technical characteristics of the fibre.

The addition of such a co-solvent allows removing from the fibres some organic substances present in the fibres in order to improve the cleaning method.

It should be understood that this addition of a co-solvent could be carried out before, during and/or after bringing the fluid into contact with the fibres to be depolluted.

Advantageously, the co-solvent is selected from among: dihydrogen monoxide; alcohols, for example aliphatic alcohols with 1 to 5 atoms, such as ethanol, methanol, butanol; aqueous solutions (for example water); terpenes; benzene; cyclohexanes and mixtures thereof; ketones; hydrofluoroethers and all other co-solvents capable of depolluting the undesirable substances present in the fibre.

Advantageously, an extractant is added to the fluid to extract from the fibres inorganic substances such as heavy metals.

The addition of such an extractant allows removing from the fibres some inorganic substances present in the fibres in order to improve the performances of the depollution phase.

It should be understood that this addition of extractant may be carried out before, during and/or after bringing the fluid into contact with the fibres to be depolluted.

Preferably, the extractant comprises a range of molecules of the calixarene type and/or solutions of agents capable of extracting inorganic substances (complexants, chelating agents, antioxidants, buffer solutions).

The addition of co-solvent(s) may also have an impact on inorganic molecules, and conversely, the addition of extractant(s) may also have an impact on organic molecules.

The addition of co-solvent(s) and/or extractant(s) in the cycle is preferably injected using a suitable pump. It should be understood that the co-solvents and the extractants are selected according to the undesirable substances to be extracted, according to the standards corresponding to the outputs.

Indeed, depending on the outputs, the results relating to purity of the desired fibre could vary.

Thus, the parameters (pressure, temperature, flow rate, cleaning time, etc.) as well as the use, or not, of co-solvents and/or extractants could vary according to the desired results.

Advantageously, the depollution step comprises, prior to bringing into contact, a humidification of the fibres.

Other parameters associated with the contacting of the pressurised dense fluid (for example a supercritical fluid) may be considered: flow rate and/or velocity of the fluid, contact duration, etc.

Advantageously, bringing into contact comprises an action of a jet of fluid in the direction of the fibres. Thanks to such a jet, the fluid penetrates throughout the material present in the autoclave.

Preferably, the jet has a velocity comprised between 1 and 500 meters per second.

Preferably, the jet comprises a flow rate comprised between 1 and 4,000 litres per hour.

Preferably, bringing into contact is carried out for a period comprised between one minute and eight hours, preferably between 15 and 120 minutes.

Thus, the flow rate and the cleaning duration could vary, in particular according to the amount of material to be treated, the parameters and the substances targeted.

For example, it is also possible to provide for rotating the fibres, for example in a rotary drum inside the cleaning chamber.

It is also possible to provide for pressure variations according to compression and depression cycles.

More generally, during the cleaning cycle, the pressure, the temperature and the flow rate of the fluid could remain constant or vary.

Advantageously, the treatment phase comprises grinding of the cigarette butts.

Preferably, such a grinding is carried out for example in a grinder or a so-called treatment vat after a collection phase and possibly a sorting operation.

The ground cigarette butts are then conveyed on a production line to undergo a plurality of treatment operations (friction and/or sieving and/or cycloning and/or secondary grinding).

Advantageously, the treatment phase comprises sieving in particular.

This or these different operation(s) primarily aim(s) to separate the fibres from the other wastes, the other wastes including leaves, ashes and/or tobaccos.

Only the fibre consisting partly of cellulose acetate is recovered. Preferably, the other wastes (leaves, tobaccos, ashes) are recycled in the form of compost.

These treatment operations may be carried out in a treatment vat adapted to this end; this vat may be independent of the autoclave or possibly be directly integrated into the autoclave.

The object of the present invention relates, according to a second aspect, to a cleaned (or depolluted) fibre obtained upon completion of an implementation of a cleaning process as described hereinabove.

Such a fibre thus depolluted could be reused for many applications, in particular in the construction, clothing field and any other field that could exploit this fibre.

The object of the present invention relates, according to a third aspect, to a cigarette butt cleaning installation comprising:
    a treatment vat configured to treat cigarette butts in order to extract fibres to be depolluted; and
    depollution means configured to depollute the fibres by bringing them into contact with a pressurised dense fluid (preferably a fluid in the supercritical state, called supercritical fluid).

In a preferred embodiment, the depollution means comprising one or several autoclave-type cleaning chamber(s).

Preferably, such an autoclave is capable of withstanding high and even very high pressures.

For example, the capacity of the chamber may vary from 0.2 L to 1,500 L, yet without limitation.

Several autoclaves may be connected and installed successively (in series or in parallel) in order to decant the pressurised fluid from one vat to another, thereby allowing preserving the fluid and thus avoiding retransforming the fluid into this state. This allows optimising the flow and saving energy and fluid. Hence, the vats could be emptied and used alternately, also allowing saving production time.

Advantageously, the installation includes means such as nozzles, pipes and/or valves in order to inject the supercritical fluid into the chamber(s).

Advantageously, the chamber may extend vertically or horizontally.

It should be noted that the vertical inclination of the chamber facilitates loading/unloading and ensures a good propagation of the fluid (carbon dioxide) in the fibres to be depolluted.

Preferably, a hermetic door locks each of the cleaning chambers.

Preferably, the nozzles and pipes for fluid inflow and outflow from the cleaning chamber are provided with grids with a fine grid pattern, called filter grids, in order to retain the fine particles of fibres during the evacuation of the fluid transporting the undesirable substances. Such grids avoid the fine fibres being transported during cleaning and ending up with the extracted undesirable residues at the outlet.

Preferably, the installation comprises a tank containing a fluid (in the liquid state), said tank being connected to said cleaning chamber.

Preferably, such a fluid is intended to be brought into the supercritical state.

Advantageously, the installation comprises heating means and pressurisation means, controllable by a central unit, respectively configured to heat the fluid up to a determined supercritical temperature and to compress the fluid up to a determined supercritical pressure, said central unit determining the supercritical temperature and pressure according to the fluid.

The installation further comprises expansion means configured to expand the fluid in order to continuously separate throughout the cycle, the fluid from the transported solid and liquid contaminants, in order to recycle said fluid.

Preferably, the expansion means are located in the installation upstream of said cleaning chamber; i.e. at the outlet of the chamber.

The separators allow separating the fluid from the contaminants by changing the fluid state by the pressure drop.

The installation may include several successive separators in which the pressures are different and lower in order to separate all toxic substances and odours accumulated during transport by the fluid.

The separators are designed so that the fluid "licks" and rubs the walls as much as possible in order to separate as much toxic substances and odours as possible from the fluid.

Preferably, the separators may be cyclonic. The toxic substances and aromas (odours) are recovered at the outlet of these separators in suitable containers such as vials or bottles.

The fluid at the outlet of the separator is captured again in order to be reinjected into the cycle continuously and in a closed circuit.

These substances and aromas are evacuated preferably by gravity thereby avoiding a possible jet of hazardous substances.

A ventilation/extractor and secure plate system may be installed in the toxic substance recovery area, thereby securing the recovery of the toxic concentrate.

The installation is sized proportionally to the selected parameters and is capable of accommodating the defined parameters (pressure, temperature, flow rate, filtration, etc.). It comprises components such as nozzles, hoses, pipes, vats, separators, tanks, pumps, condensers, heater resistances, heater bands, boilers, coolers, sensors and pneumatic, hydraulics and mechanical regulators (flowmeters, etc.).

Advantageously, the cleaning chamber comprises a rotary drum into which the fibres are introduced. It should be understood herein that such a drum could be mounted on an axis of rotation (magnetic or mechanical for example) enabling the drum to rotate on itself.

The object of the present invention relates, according to a fourth aspect, to the use of the fibres derived from cigarette butt filters for the manufacture of thermal and/or sound insulators, filters and/or biodegradable plastic objects.

Thus, it is possible to manufacture eco-designed materials based on fibres originating from cigarette butts.

Preferably, the fibres are cellulose acetate fibres.

In a particular embodiment, provision is made herein for an implementation of the method as described hereinabove to depollute said fibres.

According to a first variant, the method is used to manufacture (thermal or sound) insulation plates, such use being particularly advantageous in the construction and/or energy field.

In one embodiment, these plates are made by mixing the depolluted fibre derived from the filter with a two-component material or other compounds.

Preferably, these fibres could be bonded by adding glue, binding materials or any other material capable of securing the fibres together.

This use for the manufacture of insulation plates is valued in the field of HEQ (standing for High Environmental Quality) or VHEQ (standing for Very High Environmental Quality) type buildings, but also in other fields such as the automotive industry, the agriculture, aeronautics, electronics, electricity, etc.

According to a second variant, the method is used to make textile clothing items, such items being valued for their thermal and/or acoustic properties in particular.

In a particular embodiment, the fibres and the insulating plates are sewn and/or inserted inside the garments, as a padding in order to create an ecological insulation.

According to a third variant, the fibres are conditioned to become again filters for filtration, primarily for liquid or gas filtration.

According to a fourth variant, the fibres are used, pure or mixed, in plastic processes and transformation, to create new solid materials.

Thus, the present invention provides all actors involved in the recycling of cigarette butts with an innovative technology using the properties of supercritical fluids to depollute the fibres, and in particular the cellulose acetate fibres.

BRIEF DESCRIPTION OF THE FIGURES

Other features and advantages of the present invention will become apparent from the description hereinbelow, with reference to the appended figures which illustrate two non-limiting embodiments thereof and wherein.

DETAILED DESCRIPTION

Figure 1:
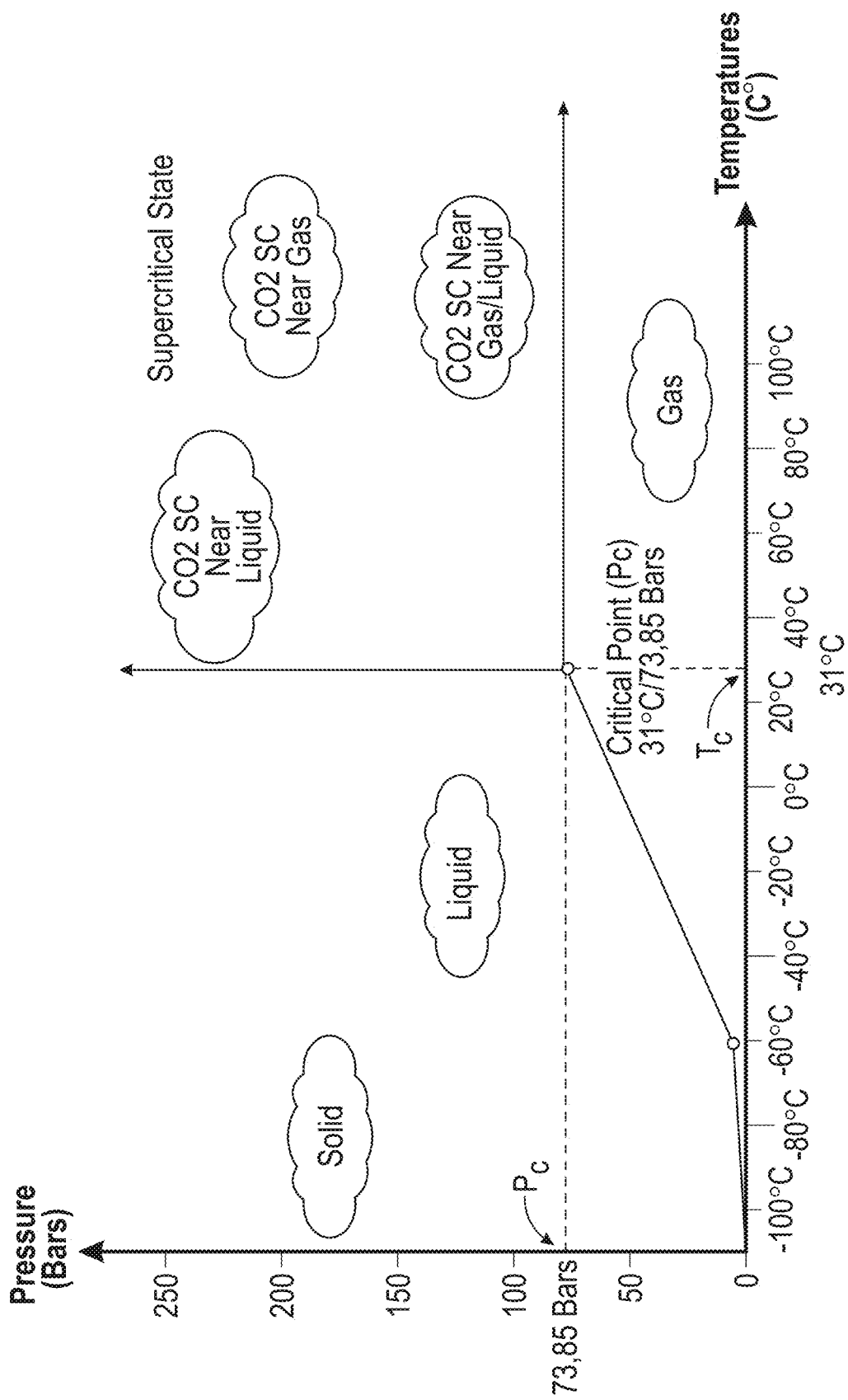
FIG. 1 represents the phase diagram of carbon dioxide.
Figure 2:
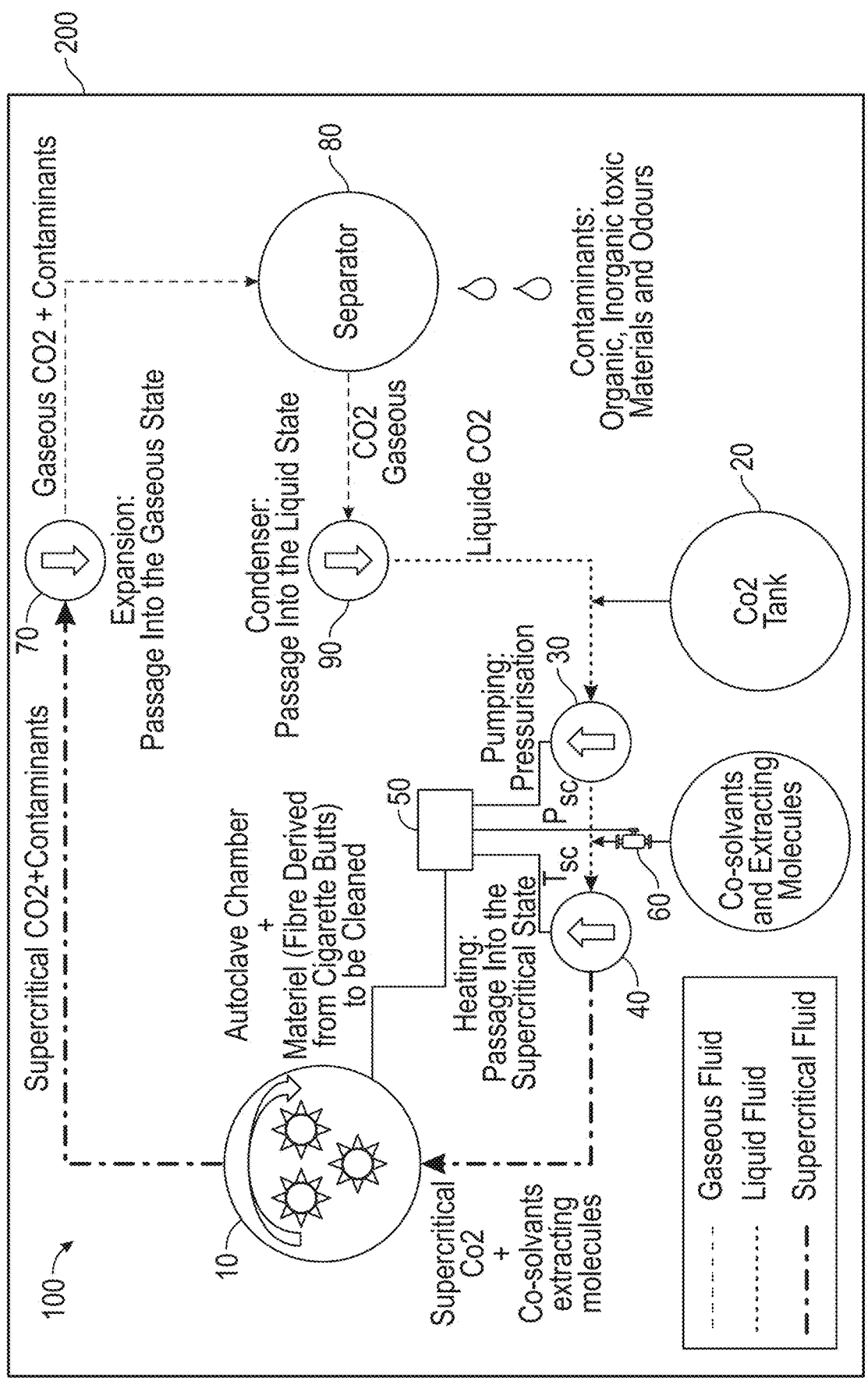
FIG. 2 represents a schematic view of a cleaning installation implementing a supercritical fluid technology for cleaning fibres from cigarette butt filters.
Figure 3:
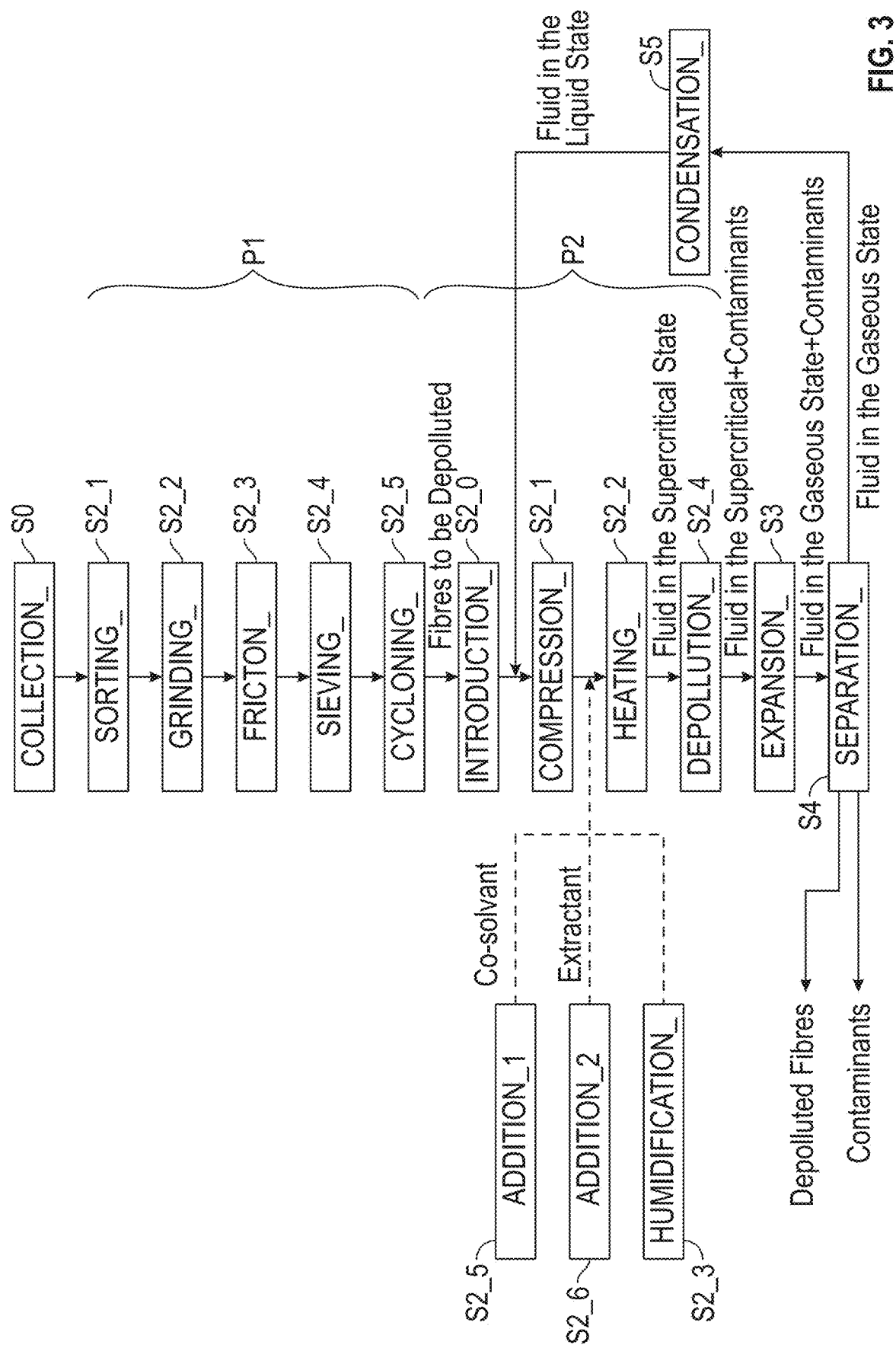
FIG. 3 represents a flowchart of a method for cleaning fibres from cigarette butt filters.

A method for cleaning cigarette butts according to an embodiment of the present invention as well as the installation associated therewith will now be described in the following with reference to FIGS. 1 to 9.

As recalled in the preamble, cleaning cigarette butts is a problem for which there is barely effective technology at the time being, for both ecological/environmental and financial reasons.

One of the objectives of the present invention consists in recovering and depolluting the fibres present in cigarette butts, and more specifically in cigarette filters, while taking into consideration the ecological/environmental and financial constraints hereinabove.

One of the other objectives of this document consists in proposing alternative solutions for the recycling and/or the reuse of the depolluted fibres.

This is made possible in the example described hereinafter.

It is known that the fibres derived from cigarette butts adsorb toxic substances and bad odours during the combustion.

These substances include organic and inorganic substances, including in particular:
 nicotine,
 heavy metals,
 organic acids (acetic acid and/or tartaric acid),
 nitrosamines,
 flumetralins, pendimethalins and/or trifluralins,
 phenols,
 polycyclic aromatic hydrocarbons (PAH),
 formaldehydes and acetaldehydes,
 dioxins and/or furans,
 anions (chlorides, nitrates, phosphates, sulphates and/or ammonium).

The cleaning and the depollution of these fibres consist in extracting these toxic substances adsorbed in these fibres during the combustion in order to transform the cigarette butt, a hazardous waste (classified: HP 14: eco-toxic and HP6: acute toxicity), into an unclassified usable raw material.

The concept underlying the present invention is to exploit the technology of pressurised dense fluids, and in particular supercritical fluids, by removing these substances to effectively clean the fibres of polluted filters.

The use of pressurised dense fluids, and in particular supercritical fluids, is an effective emerging technology that has very interesting transport properties capable of extracting toxicity from the fibre.

The Applicant observes that the supercritical fluid technology is conventionally used for the extraction of aromas (coffee or essential oils for example).

This technology is also used to dye textiles without water.

However, to date, the use of such supercritical fluids has never been considered for cleaning and depolluting smoked cigarette butts and in particular cigarette butt fibres.

In the example described herein, carbon dioxide is used as the fluid.

The Applicant believes that the use of carbon dioxide has the advantage of being an industrial waste produced in large amounts. Hence, the reuse of this waste turns out to be very interesting: Carbon dioxide is available in high purity and at low cost.

The use of the carbon dioxide waste generated by the industry allows acting on carbon neutrality through this process. Two wastes are used to generate a usable raw material.

A person skilled in the art should understand that other fluids like those listed before in the description could be reused in the context of the present invention.

Hence, FIG. 1 represents the phase diagram of carbon dioxide.

It is known that such a phase diagram exposes the different states of matter according to the different parameters associated with the pressure and the temperature of the fluid.

Under normal conditions of temperature and pressure, carbon dioxide may be in gaseous, liquid or solid states. However, it has a critical point $P_c$ corresponding to critical pressure and temperature, denoted $P_c$ and $T_c$. When carbon dioxide is subjected to a pressure and a temperature higher than those of its critical point $P_c$, it switches into a supercritical state.

Beyond the critical pressure $P_c$, any increase in the temperature imposed on the liquid leads to the formation of a less dense liquid different from the gaseous state.

Beyond the critical temperature $T_c$, any increase in the pressure applied to the gas leads to the formation of a supercritical fluid (more condensed) without passing through the liquid state.

In the supercritical state, carbon dioxide then features an intermediate behaviour between the liquid state and the gaseous state, with particular properties:
 the volumetric mass is higher and therefore similar to that of liquids;
 the diffusivity coefficient lies between that of liquids and gases;
 the viscosity is low, which is similar to that of gases.

These different states, formations and parameters are interesting and allow obtaining a versatile solvent in order to affect a wide range of substances to be extracted.

Thus, we talk about a supercritical fluid when a fluid is heated up beyond its critical temperature $T_c$ when it is compressed above its critical pressure $P_c$.

Setting of these temperature and pressure parameters allows obtaining a supercritical fluid having a solvent power comparable to that of liquid solvents, with interesting transport properties that approach them to gases.

It should be noted herein that the Applicant has also observed that by combining a supercritical fluid like carbon dioxide with fibres such as cellulose acetate, the properties of the cellulose acetate fibre have been improved: this contacting actually leads to a modification of the intrinsic properties of the polymer. It allows reducing its viscosity (glass transition).

The low viscosity and the high diffusion coefficients of carbon dioxide in the supercritical state allow for an effective cleaning due to the significant penetration of the solvent into the core of the fibre. Combining the transport properties and the efficient extraction of carbon dioxide allows for a total cleaning of the material.

According to the concept of the invention, carbon dioxide replaces the use of effective (but very polluting) organic solvents like hexane, dichloromethane, perchloroethylene, trichloroethylene and chloroform, or the use of an aqueous solution like water.

Thus, it should be understood that the supercritical state of carbon dioxide creates very effective transport properties for the depollution of fibres, and in particular the cellulose acetate fibres present in cigarette filters, without damaging them.

For carbon dioxide, the phase diagram in FIG. 1 shows that the critical point $P_c$ corresponds to a critical temperature $T_c$ higher than or equal to 31° Celsius and a critical pressure $P_c$ higher than or equal to about 73.85 bars.

By making these parameters vary properly beyond these critical values (31° Celsius and 73.85 bars), it is possible to bring the carbon dioxide to a supercritical state and obtain a very effective and targeted cleaning.

Before proceeding with the actual cleaning itself, the method according to the present invention comprises a collection step S0.

This collection step S0 could involve individuals as well as associations, communities, companies and all other collection actors.

This is a civic act for an environmental approach. All of the actors above could be considered in such an approach.

In the example described herein, there is further provided for a series of cigarette butt treatment operations during a phase P1, including in particular a sorting step S1_1 to separate the cigarette butts from any other wastes, a grinding step S1_2, and a sieving step S1_3 which could be repeated several times, in order to extract as much tobacco, ash, and leaves as possible.

Depending on the received batch, a friction step S1_3, a sieving step S1_4 and a cycloning step S1_5 may also be added, or not.

The succession of these different steps in phase P1 aims mainly to separate the cigarette fibres to be depolluted from the other wastes such as cigarette leaves, ashes, tobaccos.

It should be noted that, in the example described herein, only the fibres of the filters containing in particular cellulose acetate are kept for the depollution phase P2, the other wastes being used during a phase for the production of compost. Such a compost is made for example according to another process.

However, the ashes, the leaves and the tobacco could be subjected to the same supercritical treatment to obtain a purer compost.

In the embodiment described herein, the different treatment steps are carried out by the installation which comprises a production line comprising in particular a treatment vat (not represented herein) implementing a grinder, a sieve and/or cyclone and/or friction means (not represented herein).

It should be understood that the installation 200 does not necessarily comprise this production line; it may be remote on another site (a treatment carried out by subcontracting, for example).

The installation 200 further comprises a cleaning chamber 10 in the form of an autoclave, said chamber 10 being configured to clean the fibres originating from the cigarette filters by bringing these fibres into contact with the fluid at the supercritical state.

Hence, the chamber 10 is configured to contain a fluid in the supercritical state, and therefore to withstand high temperatures and pressures.

In the example described herein, this chamber 10 is a hermetically sealed enclosure, preferably made of stainless steel.

Hence, the first step S2_0 of this depollution phase P2 comprises the introduction and positioning of the fibres to be depolluted into the cleaning chamber 10.

The fibres are herein introduced into a fixed container.

However, several alternatives may be considered during cleaning to optimise and reduce the parameters used inside the cleaning chamber. Indeed, by combining the supercritical technology with other mechanical, electrical or chemical means, it is possible to reduce the elements necessary for cleaning. To optimise the method, i.e. to reduce the time, the amount of fluid, the pressure and/or the temperature, the cleaning may be completed with either one or other of these elements:

- a rotating drum placed in the tank and driven by a magnetic or mechanical torque allowing setting the material in motion in order to facilitate spreading of the supercritical fluid (like a screen or concrete mixer); and or
- a vibration and ultrasound system allowing the targeted substances to be extracted more easily, by combining the advantages of ultrasounds with that of the supercritical carbon dioxide; and or
- mechanical compression means, in particular by a pneumatic or hydraulic cylinder, or a worm screw in order to compress the fibre and force the extraction of the molecules to be extracted; and or
- a mixer located therein to homogenise the cleaning; and or
- a centrifugal system in order to direct all extracted substances outwards, thereby avoiding the re-adsorption thereof at another location in the fibre; and or
- energising means inside the tank in order to electrocute the fibre and facilitate the extraction; and or
- soaking in an aqueous solution during the cleaning cycle (supercritical fluid-liquid configuration).

All these improvements could be used alone or in combination. Stirring, vibration, compression, tensioning or any other movement and action may be added in order to improve or advantageously optimise the cleaning conditions on any amount of material.

Of course, these applications remain optional and are not limiting in any manner whatsoever.

The concept underlying the present invention is to bring these fibres into contact in the chamber 10 with a fluid in the supercritical state, herein carbon dioxide.

In this example, provision is therefore made to connect the cleaning chamber 10 to a tank 20 containing carbon dioxide.

To this end, a set of valves, nozzles and inlet and outlet pipes (not represented herein) configured to connect the cleaning chamber 10 and the tank 20 is provided for.

Preferably, these elements are provided with grids with a fine grid pattern in order to retain and filter the fine particles of fibres that might be entrained during the evacuation of the fluid transporting the undesirable substances.

Such grids avoid these fine fibres being transported out of the chamber during cleaning and ending up with the extracted undesirable residues at the outlet.

Prior to bringing the fluid into contact with the fibres to be depolluted, it is desirable to bring said fluid to the supercritical state.

In this example, it is then provided for the cleaning chamber 10 comprising compression means 30 and heating means 40 respectively configured to compress during a step S2_1 said fluid up to a supercritical target pressure $P_{sc}$ and to heat during a step S2_2 said fluid up to a supercritical target temperature $T_{sc}$.

In this example, the compression 30 and heating 40 means are controllable by a central unit 50.

Thus, this central unit 50 comprises electronic storage means (not represented herein) storing the information relating to the settings associated with the supercritical cleaning such as the supercritical temperature $T_{sc}$ and pressure $P_{sc}$ according to the used fluid.

In this example, these supercritical temperature $T_{sc}$ and pressure $P_{sc}$ respectively correspond to a temperature higher than or equal to 31° Celsius and a pressure higher than or equal to 73.85 bar. These parameters are herein associated with carbon dioxide as set out before.

It should be noted herein that the energy resources to reach these parameters are very low and energy-efficient.

In the example described herein, it is the central unit 50 which controls the compression 30 and heating 40 means to bring the fluid to the supercritical state.

In this example, it is also possible to provide for an additional step S2_3 of wetting the fibres.

This step S2_3 remains optional.

Once the fluid has been brought to the supercritical state, the depollution phase P2 comprises bringing S2_4 the supercritical fluid into contact with the fibres to be depolluted inside the autoclave 10. As explained before, carbon dioxide in the supercritical state turns out to be a powerful solvent: bringing S2_4 such a supercritical fluid into contact with the fibres of cigarette butts to be depolluted allows extracting apolar organic molecules from the fibres, such molecules being mainly formed of long carbon chains with a low molar mass (lipids and fatty substances).

Bringing into contact S2_4 could be done in several forms, possibly combined with each other: high-pressure vaporisation, soaking, jet nozzle, spraying, etc.

In the example described herein, provision is made for soaking combined with the action of a jet.

Thus, the cleaning chamber 10, or autoclave, comprises spray means (not represented herein) adapted to emit a jet of carbon dioxide in the supercritical state.

In this example, the electronic storage means store other parameters relating to cleaning such as the contact duration (soaking duration), the flow rate of the jet and/or the speed of the jet.

In this example, provision is made for the jet propelled in the direction of the fibres to have a variable speed comprised between 1 and 500 meters per second with a flow rate comprised between 1 and 4,000 litres per hour.

In this example, provision is made for contacting S2_4 to be carried out for a period comprised between one minute and eight hours, this period varying according to the desired cleanliness characteristics and the amount of material to be treated.

In this example, the electronic storage means also stores other parameters associated with contacting.

It is possible to provide for pressure and temperature variations according to compression and depression cycles, such cycles improve the performance of the depollution.

It is also possible to provide for parameters relating to the speed of rotation of the rotary drum.

This could also be animated by jerks or by movements other than rotative ones (pendulum or others).

In order to improve the performances associated with the depollution P2, it is possible to provide for adding a co-solvent to the fluid during a step S2_5.

The addition S2_5 of a co-solvent (methanol, ethanol, etc.) during the depollution phase increases the polarity and the selectivity of the cleaning in order to also extract the polar organic molecules with shorter chains (sugar, ions . . . ).

In the example described herein, this addition S2_5 is provided between the compression step S2_1 and the heating step S2_2, by means of a suitable pump. Said co-solvent could also be added upstream or downstream of cleaning. The selection and the use of these so-called co-solvents depend on the targeted substances to be extracted to correspond to the standards of the different outputs.

It should be noted that the development of a chamber operating at high pressure (beyond 350 bars) allows extracting increasingly polar molecules without adding co-solvents.

To extract the inorganic materials like heavy metals for example, the installation 200 is further configured to add extracting molecules of the calixarene type, or solutions of agents capable of extracting the inorganic substances (complexants, chelating agents, antioxidants . . . ) to the supercritical fluid during a step S2_6.

This supplemental addition S2_6 enables the formation of complexes with the inorganic compounds, which will enable them to be transported at the same time.

In the example described herein, like for step S2_5, provision is made for this addition S2_6 to be carried out between the compression step S2_1 and the heating step S2_2 via an appropriate pump. Said extractant may also be added upstream or downstream of cleaning. The selection and the use of these so-called extractants depend on the targeted substances to be extracted to correspond to the standards of the different outputs.

The additions of co-solvents and/or extractants is implemented by the central unit 50 which controls means 60 adapted to inject co-solvents and/or extractants into said fluid by means of a pump.

At the chamber outlet, the fluid is cooled down and depressurised by expansion means 70 during a step S3 for a transition to the gaseous state (or expansion). These expansion means 70 allow expanding the fluid in order to continuously separate the fluid from the solid and liquid contaminants that are transported.

The carbon dioxide is then released in a gaseous form thanks to a recovery system 80 serving as a separator between the fluid and the contaminants.

Several separators, with decreasing pressures, could follow one after another in order to optimise the separation of the fluid and of the contaminants. The odours and the toxic substances separate from the fluid under different pressures. Hence, it is important that the separation takes place in different separators including different pressures. During this separation, the fluid "licks" and skims the walls so that as much toxic substances and aromas as possible are detached. These steps are carried out continuously during the cleaning cycle; during a step S4 this separator 80 evacuates the carbon dioxide in the gaseous state towards a condenser 90 which during a step S5 transforms the carbon dioxide in the liquid state to return it to the storage tank 20 for reuse thereof. Carbon dioxide is recycled and used continuously in a closed cycle.

This separator 80 evacuates the contaminants in suitable, separate and isolated containers.

At the end of the cycle, several filtration or particle/molecular absorption steps could possibly be added (in addition to the continuous separation carried out during the switch from the supercritical into gaseous state during cleaning) in additional steps on the fluid in the liquid, gaseous, or supercritical state, during or after the cycle in order to ensure a complete separation of the undesirable liquid and/or solid particles that might have remained dissolved in the fluid, in order to recover pure supercritical fluid to be reinjected into the next cycles.

This fluid could pass through activated carbon in order to capture the possible odorous molecules and VOCs. Activated carbon could be added at the outlet or in the cleaning chamber where necessary.

It should be noted that this fluid could return to the cleaning chamber 10 as many times as necessary. Afterwards, the rest of the polluted flow is evacuated and treated, because by being released and changing into a gaseous state, the carbon dioxide separates from the contaminants.

These contaminants are used during a phase of recovering the organic and inorganic substances (hydrocarbons, heavy metals, pesticides, sugars, etc.). For example, such a recovery is carried out according to another process.

The depolluted fibre is then recovered.

Thus, the technology of fibre cleaning with a supercritical fluid enables the fluid to be continuously recycled automatically by changing state. Upon leaving the chamber, it switches during expansion (loss of volumetric mass) from the supercritical state into the gaseous state and loses its effectiveness as a powerful solvent, releasing the undesirable substances (in a liquid or solid form) transported during the supercritical state. These undesirable substances are recovered in special-purpose containers in order to be treated and recovered.

Once the physico-chemical separation is complete, the fluid could be injected again into the chamber in the supercritical state. A step of separation by filtration/absorption may be added to facilitate the recovery of the residues dissolved in the fluid (during or after cleaning, in the gaseous, liquid or supercritical state), and to purify the fluid in order to recover all of its extraction effectiveness.

The fluid passes through one or several enclosure(s) and separator(s) (accompanied by expansion valves) capable of purifying it and making it reusable, by capturing and collecting all contaminants.

In the example described herein, the fluid further passes through an activated carbon filter in order to trap the odorous molecules and the volatile organic compounds. Activated carbon could also be added in the chamber. This step is not mandatory.

The high volatility of the fluids at atmospheric conditions categorises the fluid as a dry solvent, thereby requiring no drying step.

The inert, non-toxic, and non-hazardous solvent fluid does not risk damaging the work conditions of the users.

The present invention allows obtaining a technology that does not have the drawbacks of the prior art.

By adapting the technology of supercritical fluids and by setting the parameters relating in particular to setting of the pressure, the temperature, the flow rate, the duration of contacting, the co-solvents and the extractants, the present invention allows depolluting the fibres originating from the filters of the cigarette butts by extracting the odours, the organic and inorganic matters that classify the cigarette butt as undesirable waste.

This extraction is done by separating these toxic substances and odours from the fibrous material. Such technology then provides ecological cleaning involving very little water and/or chemical solvents.

Such a technology allows managing very large amounts easily, with little effluents to be treated.

Such a cleaning then allows revalorising the cigarette butt which has become a real toxic waste for the environment.

The recovery of these cigarette butts is one of the other advantageous aspects that directly arise from the present invention.

Indeed, by depolluting the fibres it becomes possible to reuse them and exploit the technical characteristics of these fibres and in particular of these cellulose acetate fibres, such fibres having interesting acoustic and/or thermal properties.

Hence, it is possible to use the depolluted fibres for the field of insulation, in a bulk form or in such a way that these fibres could for example be arranged and transformed into plates in order to create insulation rolls.

For this purpose, it is preferable to bond and solidify the recycled cellulose acetate fibres together. A two-component material is then added and mixed with the fibre. This two-component material of the Trevira 255 2.2 dtex/6 mm: PES copoolyethylene type is a material composed of a core and its contour. Its contour, which is more sensitive to heat, melts down at temperatures lower than that of the core and of the other components, which allows unifying all fibres. Hence, these two-component materials have been selected according to the characteristics of the recycled fibres. This process also works with any type of two-component material (possibly a bio one).

The bonding of the fibres could also be carried out with all types of material like glues or binding materials.

It is desirable to carry out a mixing and a homogeneous intermingling of the cellulose acetate fibres and of the initial two-component material (for example 15% of two-component material and 85% of acetate fibre) in order to obtain a good distribution of the materials for good solidification and harmonisation of the plate.

The distribution of a two-component material and of the acetate fibres may vary according to the desired characteristics of the material (more or less solid, flexible, resistant, etc.).

It should be understood that the addition of the two-component material makes the material more resistant and more rigid. These plates may also be shaped by other processes such as gluing, weaving, carding, spinning, compression, etc. The obtained insulating material could then be used for insulation in the construction sector, but also in the field of clothing and in any other field requiring an insulating fibre.

This depolluted fibre could also be used to form filters and/or air, water, liquid or gas filtration systems (urban, automotive, aeronautical, hydrocarbon field, etc.).

It is still possible to reduce the cellulose acetate into a material that could be used in all types of plastic processes (in particular moulding) so that this recycled material is transformed into objects. It may be mixed with other materials to create biodegradable products. In addition, it could also be used in the field of composites by mixing it with other materials (glues, binders, two-component, etc.). It is also used in all types of materials.

For this use, provision is made to reduce the fibre into powder, or to set it in a state that could be used by plastics processes. This allows inserting it into machines such as extrusion, injection, moulding, thermocompression or still thermoforming machines. It should be noted that such a material is transformed at temperatures comprised between 80° C. and 300° C. in these different processes.

Thus, it should be understood that the present invention provides for the implementation of a supercritical fluid technology for cleaning and depollution of the fibres derived from the filters of cigarette butts. Such a cleaning and such a depollution are obtained by bringing said fibres into contact with a fluid of the carbon dioxide type in the supercritical state.

By setting the parameters of the autoclave into which the cigarette butt fibres are introduced, it is possible to bring said fluid to so-called supercritical target temperature and target pressure allowing for a good extraction of the toxic substances contained in the fibres. The implemented process is also environmentally friendly and has an acceptable financial cost on an industrial level.

Analyses carried out on the fibres depolluted according to the method of the invention allow noticing a significant reduction in the nicotine concentration: the residual concentration of nicotine in the depolluted cigarette butts no longer results in the classification for the hazard property HP6 "acute toxicity" and HP 14 "eco-toxic" as is the case for the sample before treatment.

The results of the depollution allow concluding on a classification of the depolluted fibres as non-hazardous wastes.

Once depolluted without decontamination water, it becomes possible to reuse these fibres in the form of new eco-designed material used in bulk and/or transformed in several fields such as:

textile clothing items (insulating coat padding, insulating cushioning, sewing threads, fabrics, wool to be used in the creation of textile-based clothing or objects: mattress, cushion, duvet, hat, headwear, handbag . . . );

thermal and/or sound insulation materials (building, electronics, automotive: lithium battery insulator for electric vehicles, aeronautics, shipbuilding and all other fields requiring thermal and/or sound insulation . . . );

materials for outdoor mulching/geotextile: canvas, plate, bulk . . . the depolluted material becomes again a biodegradable natural fibre that could be used in nature (at the feet of trees, etc.);

filtering materials (liquid, gas, etc.);

in the form of fibrous plates or bulk fibres in accordance with the standards of the considered field.

These fibres are also valued in the plastics industry in order to create new eco-designed solid materials with or without mixing.

It should be understood that these new materials will consist of raw materials, semi-finished or finished products.

Other uses could also be considered within the scope of the present invention.

This technology of cleaning with a supercritical fluid has very interesting extracting and cleaning properties that are even more effective than the polluting solvents, detergents and aqueous solutions that have been used until now. This cleaning with a supercritical fluid has the advantage of being completely green, neutral and ecological with low amounts of discharges (almost zero residual effluent following cleaning, requiring little secondary treatment and therefore economically interesting), which allows managing large amounts easily.

To highlight the significant advantages provided by the method of the invention, analyses have been carried out on the following samples:

20AJ404: Batch of untreated cigarette butts;

20AJ405: Batch of treated cigarette butts—Test 1;

20AJ406: Batch of treated cigarette butts—Test 2.

More particularly, it consists of three batches of samples of ground cigarette butts which may have undergone, or not, a treatment intended to extract the polluting substances.

For each batch, about 100 g of samples have been extracted with 5 mL of methanol.

Analysis Results of the Nicotine and of the Phenols:

The analyses of the nicotine have been carried out by gas chromatography with flame ionisation detection (GC-FID).

The analyses of the phenols have been carried out by high-performance liquid chromatography (HPLC). Table 1 below represents the results of the quantitative analysis of the nicotine and phenol content in the cigarette butts in mg/kg:

TABLE 1

|  |  | 20AJ404 Untreated cigarette butts | 20AJ405 Treated cigarette butts Test 1 | 20AJ406 Treated cigarette butts Test 2 |
|---|---|---|---|---|
| Nicotine |  | 5,580 +/− 51 | 870 +/− 7 | 418 +/− 13 |
| Phenols | Phenol | 317 +/− 17.3 | 48.0 +/− 1.1 | 41.6 +/− 6.0 |
|  | m + p-cresol | 191 +/− 21.0 | 16.5 +/− 4.3 | 19.9 +/− 0.4 |
|  | o-cresol | 76.7 +/− 11.1 | 5.59 +/− 1.83 | 8.79 +/− 0.42 |
|  | 2-ethyl-phenol | 15.8 +/− 1.9 | <2.50 | <2.50 |

Analysis Results of the Organic Acids and Cyanides:

The analysis of the organic acids has been carried out by ion-exchange chromatography with conductometric detection after aqueous extraction at about 1 g.

The analysis of the cyanides has been carried out by ion-exchange chromatography with amperometric detection after extraction at about 1 g and trapping in 30 mL of a 1M sodium hydroxide solution.

Table 2 below represents the results of the quantitative analysis of the content of organic acids and cyanides in cigarette butts in mg/kg:

TABLE 2

|  | 20AJ404 Untreated cigarette butts | 20AJ405 Treated cigarette butts Test 1 | 20AJ406 Treated cigarette butts Test 2 |
|---|---|---|---|
| Acetic acid | 6,750 | 3,720 | 5,100 |
| Propionic acid | 70 | 20 | 30 |
| Formic acid | 950 | 1 250 | 810 |
| Butyric acid | <1.3 | <1.3 | <1.3 |
| Valeric acid | <25 | <25 | <25 |
| Tartaric acid | 380 | 290 | 260 |
| Cyanides | 22.4 | 12.2 | 9.90 |

Analysis Results of the Metals:

The analyses of the following 24 metals and metalloids: aluminium (Al), arsenic (As), boron (B), barium (Ba), calcium (Ca), cadmium (Cd), chromium (Cr), copper (Cu), iron (Fe), mercury (Hg), potassium (K), lithium (Li), magnesium (Mg), manganese (Mn), molybdenum (Mo), sodium (Na), nickel (Ni), phosphorus (P), lead (Pb), antimony (Sb), selenium (Se), silicon (Si), titanium (Ti) and zinc (Zn), have been carried out by Inductively Coupled Plasma Optical Emission Spectrometry (ICP-OES) or by Inductively Coupled Plasma Mass Spectrometry (ICP-MS) after acid digestion (HN03) of about 300 mg of samples in a closed microwave oven.

ICP-OES has been used for: (Al, Ba, Ca, Cu, Fe, Hg, K, Mg, Mn, Na, P, Si, Ti and Zn).

ICP-MS has been used for: (As, B, Cd, Cr, Li, Mo, Ni, Pb, Sb and Se). Table 3 below represents the results of the quantitative analysis of the metal content in the cigarette butts in mg/kg.

TABLE 3

|  | 20AJ404 Untreated cigarette butts | 20AJ405 Treated cigarette butts Test 1 | 20AJ406 Treated cigarette butts Test 2 |
|---|---|---|---|
| Ca | 11,100 +/− 100 | 13,300 +/− 700 | 18,500 +/− 900 |
| Cd | 0.16 +/− 0.01 | 0.23 +/− 0.02 | 0.32 +/− 0.01 |

TABLE 3-continued

| | 20AJ404<br>Untreated<br>cigarette butts | 20AJ405<br>Treated<br>cigarette butts<br>Test 1 | 20AJ406<br>Treated<br>cigarette butts<br>Test 2 |
|---|---|---|---|
| Cr | 2.38 +/− 0.20 | 3.21 +/− 0.87 | 11.6 +/− 0.88 |
| Cu | 7.30 +/− 0.30 | 6.52 +/− 0.45 | 17.6 +/− 0.61 |
| Fe | 1,660 +/− 110 | 1,930 +/− 330 | 3,060 +/− 260 |
| Hg | <8 | <8 | <8 |
| K | 3,670 +/− 50 | 6,340 +/− 490 | 6,800 +/− 800 |
| Li | 1.04 +/− 0.03 | 1.79 +/− 0.14 | 2.32 +/− 0.08 |
| Mg | 766 +/− 14 | 1,110 +/− 50 | 1,470 +/− 30 |
| Mn | 10.6 +/− 0.15 | 24.9 +/− 1.49 | 47.5 +/− 1.57 |
| Mo | 0.10 +/− 0.01 | 0.15 +/− 0.03 | 0.39 +/− 0.02 |
| Na | 622 +/− 11 | 347 +/− 24 | 558 +/− 13 |
| Ni | 2.23 +/− 0.13 | 3.25 +/− 0.75 | 12.2 +/− 0.20 |
| P | 125 +/− 1 | 228 +/− 5 | 406 +/− 14 |
| Pb | 1.07 +/− 0.12 | 2.05 +/− 0.13 | 3.56 +/− 0.09 |
| Sb | 0.02 +/− 0.002 | 0.07 +/− 0.014 | 0.18 +/− 0.009 |
| Se | 0.07 +/− 0.002 | 0.10 +/− 0.030 | 0.15 +/− 0.015 |
| Si | 1,990 +/− 180 | 1,800 +/− 260 | 2,570 +/− 440 |
| Ti | 59.6 +/− 9.5 | 50.3 +/− 12.8 | 66.0 +/− 12.2 |
| Zn | 18.9 +/− 0.4 | 55.7 +/− 25.2 | 75.2 +/− 22.4 |
| Al | 1,220 +/− 110 | 1,510 +/− 360 | 1,730 +/− 310 |
| As | 0.15 +/− 0.01 | 0.24 +/− 0.03 | 0.26 +/− 0.01 |
| B | 5.20 +/− 1.69 | 10.2 +/− 5.1 | 8.44 +/− 0.91 |

Results of Complementary Analyses:

The water content in the samples has been determined by oven drying (105° C.) to a constant mass (Table 4 below)

Table 4 below represents the results of the analysis relating to the water content of the cigarette butt samples:

TABLE 4

| Sample | 20 AJ 404<br>Raw<br>cirgarette butts | 20 AJ 405<br>Test 1 | 20 AJ 406<br>Test 2 |
|---|---|---|---|
| Water content | 3.53% | 3.74% | 3.92% |

Given the low water content values, these have not been taken into account in the calculations.

In addition, in order to be able to specify the speciation of some metals, the pH of an aqueous solution in contact with the samples has been determined. The ratio between the mass of the test sample and the volume of water is ¹/₁₀.

Table 5 below represents the results of the analysis relating to the pH of the samples:

TABLE 5

| Sample | 20 AJ 404<br>Raw<br>cigarette butts | 20 AJ 405<br>Test 1 | 20 AJ 406<br>Test 2 |
|---|---|---|---|
| pH | 7.95 | 8.46 | 8.78 |

The pH values, corresponding to slightly basic solutions, allow discarding the presence of large amounts (>g/kg) of alkaline substances such as potash (KOH), soda (NaOH) or lime ($Ca(OH)_2$).

The assessment of the hazard properties has been carried out based on the results hereinabove. This assessment has been carried out according to the XP X 30-489 standard.

It is known that before treatment, the presence of nicotine in the cigarette butts at a concentration of 5,580+/−51, mg/kg results in the classification of the sample as a hazardous waste under the HP 6 property "acute toxicity".

After treatment, we obtain satisfactory, even very satisfactory, results.

On the two samples 20 AJ 405 (TEST 1) and 20 AJ 406 (TEST 2), the iterative approach allows concluding that the first sample after treatment could be qualified as non-hazardous wastes under the HP 4, HP 5, HP 6, HP 7, HP 8, HP 10, HP 11, HP 13 and HP 14 properties through an assessment by calculation.

For each of the two samples, the nicotine concentration (initially at about 5,580 mg/kg) falls after treatment to 870 mg/kg and 418 mg/kg. It has been sufficiently reduced (7 to 13 ratio) until no longer leading to a classification under the HP6 property "acute toxicity".

Hence, the completed analyses allow noticing a reduction in the nicotine concentration in the cigarette butts by the implemented method because after treatment, the residual concentration of nicotine no longer leads to a classification for the HP6 hazard property "acute toxicity" as it has been the case for the sample before treatment.

As regards the HP 14 property, tests also show that the treatment allows reaching a classification as non-hazardous waste according to HP14.

To highlight the interesting technical characteristics of the depolluted fibre, analyses have been carried out to prove its effectiveness as an acoustic and technical insulator:

For this purpose, several samples with different numberings have been provided so that they could be analysed to determine their different technical characteristics. The aim is also to analyse the impact of grinding on the characteristics of the fibre.

"Fibre/mixture/plate.1" means that the material has undergone only one grinding, "Fibre/mixture/plate.2" two grindings "Fibre/mixture/plate.3" three grindings "Fibre/mixture/powder plate" ground until becoming powder Thermal Conductivity Properties:

This test is intended to measure the thermal conductivity and the heat capacity of the material.

The device consists of two exchanger plates insulated on the rear face, one of which is fixed and the other one is movable. Inside each exchanger plate, a heat-transfer fluid circulates whose temperature is regulated by a thermostated bath. The baths could be programmed to ensure a variation over time. The equipment allows imposing any temperature on each of the two main faces of the sample. To measure the temperature of the insulation, two thermocouples are used and positioned outside the material to be characterised. In order to measure the heat flux that crosses the sample, two fluxmeters are placed on each of the faces.

The experiment will take place in three stages:

Step 1: each plate has a temperature of 20° C.

Step 2: each plate has a temperature of 25° C.

Step 3: one plate is at 20° C. and the other one is at 25° C.

The dimensions of our samples are 30.5*30.5 $cm^2$ and have the following density values as a volumetric mass: Plate No. 3.4: 0.16 $g/cm^2$ Plate No. 2.1: 0.13 $g/cm^2$ Plate No. 1.1: 0.15 $g/cm^2$ Determination of the Specific Heat:

At the time point t=0, a temperature T=20° C. is imposed on each side of the plate. This temperature is maintained until a thermal equilibrium is obtained. Then, this step is repeated with T=25° C. Finally, a temperature difference is established by setting T1=20° C. and T2=25° C., this causes the system to evolve towards another state of equilibrium. Between these two time points, the polystyrene has stored a determined amount of heat energy. The total stored energy (Q) is calculated using the following relationship:

$$\sqrt{Q = \left|\left(\int_{20}^{25}(|\Phi 1|+|\Phi 2|)\right)dt - Cfluxmetres\right| * S} = m*Cp*\Delta T$$

m*Cp*ΔT With: ΔT=T2−T1, Φ1+Φ2=the cumulative heat flux in the plate,

Cfluxmeters=heat capacity of the fluxmeters,
Cp=the specific heat and m=the mass of the plate.

Determination of the Thermal Conductivity:

To determine the thermal conductivity, a temperature T=25° C. is imposed on the material until a state of equilibrium is obtained. During the switch into this state of equilibrium, the relationship hereinbelow allows obtaining the conductivity of our recycled material:

$$\lambda = e\sum\Phi/4\Delta T$$

With:
e=the thickness of the plate,
ΣΦ=the sum of the fluxes measured at the boundaries of the plate
ΔT=the temperature difference.

Results Obtained from the Thermal Resistance Tests:

TABLE 6

| Designation | Dimensions (cm) | Thicknesses (cm) | Mass (g) | Volumetric mass (kg/m3) | Thermal conductivity (W/m.K) | Thermal resistance R | Thicknesses (mm) for R = 5 standard to be met |
|---|---|---|---|---|---|---|---|
| Powder plate | 30.5 × 30.5 | 2.5 | 100 | 77.4 | 0.049 | 20 | 24.7 |
| Plate 1 | 30.5 × 30.5 | 2.5 | 100 | 64.5 | 0.046 | 21.4 | 23.37 |
| Plate 2 | 30.5 × 30.5 | 2.5 | 100 | 55.8 | 0.047 | 21.2 | 25.55 |
| Plate 3 | 30.5 × 30.5 | 2.5 | 100 | 47.3 | 0.043 | 22.92 | 21.8 |
| Bulk (fibre) | 11 × 10.5 | 4 | 40 | 17.2 | 0.042 | 23.26 | 21 |
| Bulk (powder) | 11 × 10.5 | 4 | 66.76 | 28.7 | 0.045 | 22.09 | 22.63 |

Thanks to the results obtained during the experiments, we can affirm that the depolluted fibre is actually insulating because it has conductivity values lower than 0.06 W/m·K (CF Standard NF EN 13162+A1). Indeed, the material has an average conductivity value of 0.045 W/m·K. This value is the limit for a material to be considered as an insulator. Hence, all samples derived from the depolluted fibre are considered as insulators. Their conductivity and resistance values approach the characteristics of mineral wool. It is also possible to consider that thanks to the tests, the less there is grinding, the more the material is insulating. This means that there is a relationship between the volumetric mass and the thermal conductivity. Hence, it is possible to imagine finding subsequently the optimum volumetric mass/thermal conductivity for our material.

Water Vapour Permeability Properties:

The hygrometric functioning of a material represents the behaviour of the material undergoing a large variation in temperature and humidity. This is the ability of the material to absorb or reject energy to preserve the thermal comfort of the dwelling. This manipulation is intended to measure and characterise the permeability of the recycled material.

Protocol: The samples to be tested are placed in jars. A little bit of water is present at the bottom of the jar to create humidity. Rings are placed to raise the sample and create an air area between the water and the product (1.2 cm). This volume will be the same for all tests. To avoid direct transfer between the climatic enclosure and the trapped air, a seal with a mixture of beeswax and paraffin (60/40%) is formed and applied between the jar and the sample. Afterwards, the device is placed in a climatic enclosure set at a humidity level of 50%. A weighing of the mass is carried out every 24 hours in order to determine the amount of evaporated water.

Here is the evolution of the mass as a function of time and of lost mass percentage:

TABLE 7

| Day | 0 | 1 | 2 | 3 | 6 | 7 |
|---|---|---|---|---|---|---|
| Hour | 0 | 24 | 47 | 71 | 141 | 165 |
| Plate 1 | 522.19 | 520.54 | 518.78 | 517.17 | 512.39 | 510.86 |
|  | 0 | −0.32% | −0.65% | −0.96% | −1.88% | −2.17% |
| Plate 2 | 548.44 | 546.92 | 545.53 | 544.12 | 540.16 | 538.86 |
|  | 0 | −0.28% | −0.53% | −0.79% | −1.51% | −1.75% |
| Plate 3 | 545.26 | 544.1 | 542.89 | 541.69 | 538.49 | 537.31 |
|  | 0 | −0.21% | −0.43% | −0.65% | −1.24% | −1.46% |
| Powder plate | 552.61 | 551.2 | 549.92 | 548.55 | 544.7 | 543.45 |
|  | 0 | −0.26% | −0.49% | −0.73% | −1.43% | −1.66% |

Figure 4:
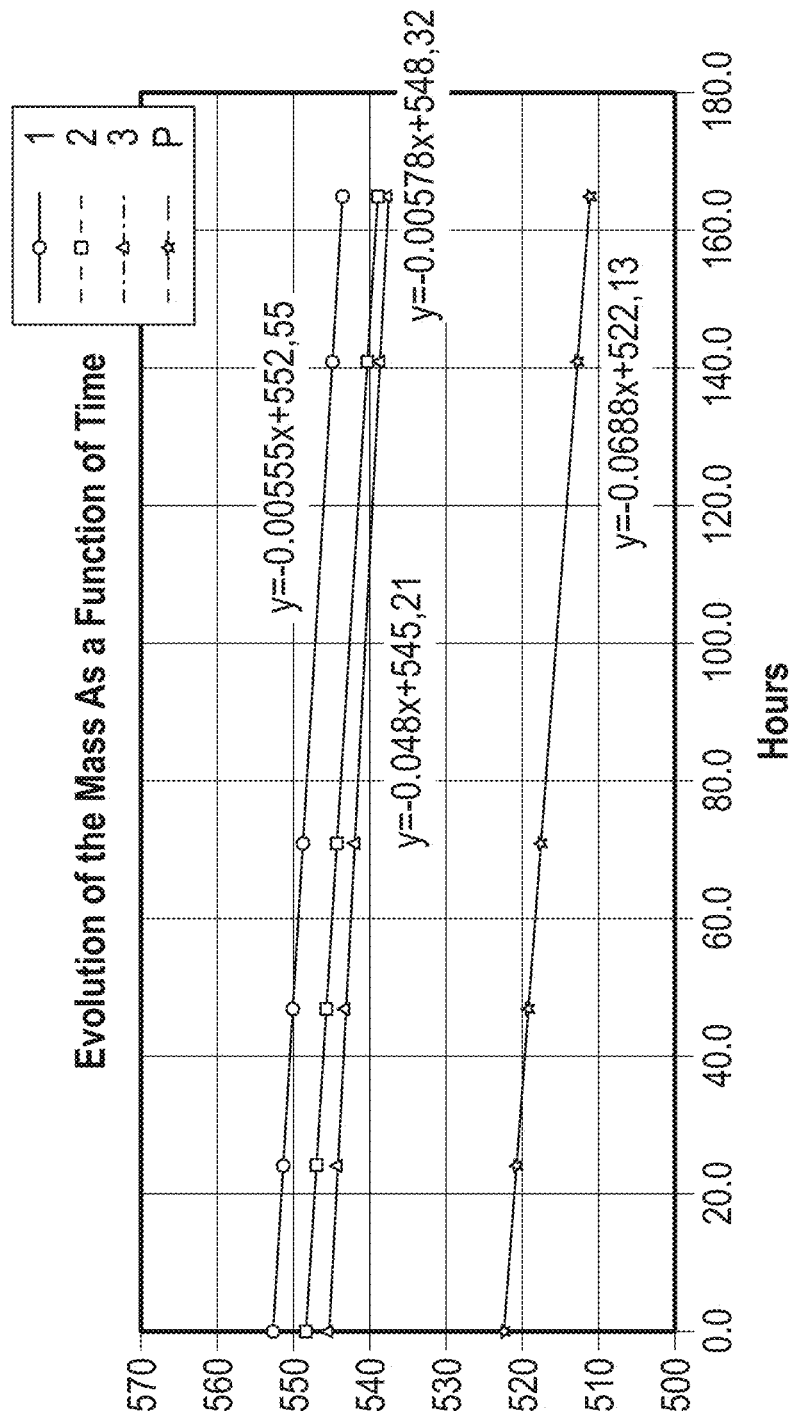
FIG. 4 is a graph representing the evolution of the mass of several samples over time.

FIG. 4 provides a graphic illustration of this evolution of the mass of the different products over time.

The obtained permeability results are as follows (and comparison of the permeability of the different materials):

TABLE 8

| Materials | Permeability to vapour (μ) |
|---|---|
| Results on the tested materials | |
| 1 grinding plate | 2.09 |
| 2 grinding plate | 2.99 |
| 3 grinding plate | 2.88 |
| Powder plate | 2.50 |
| Results on off-the-shelf materials | |
| Mineral wool | 1 |
| Wood wool panel | 5 |
| Fibre panel | 5 |
| Recycled textile (mix) | 2-3 |
| Cellulose wadding | 2 |

According to the NF EN ISO 10456 standard, we obtain the data gathered in the following table.

The recycled material is within the same range as the mix.

This material has a high absorption capacity.

Acoustic Properties:

The acoustic resistance of the material is an important data in the characterisation of the product.

The experiments carried out in the laboratory have enabled us to obtain the absorption coefficient as well as the attenuation index of the recycled material.

Absorption coefficient: The sound absorption coefficient defines the ratio between the absorbed noise and the incoming noise. This varies with the sound frequency. The absorption coefficient is comprised between 0 and 1. The closer the material is to 1, the more absorbent is the material.

Figure 5:
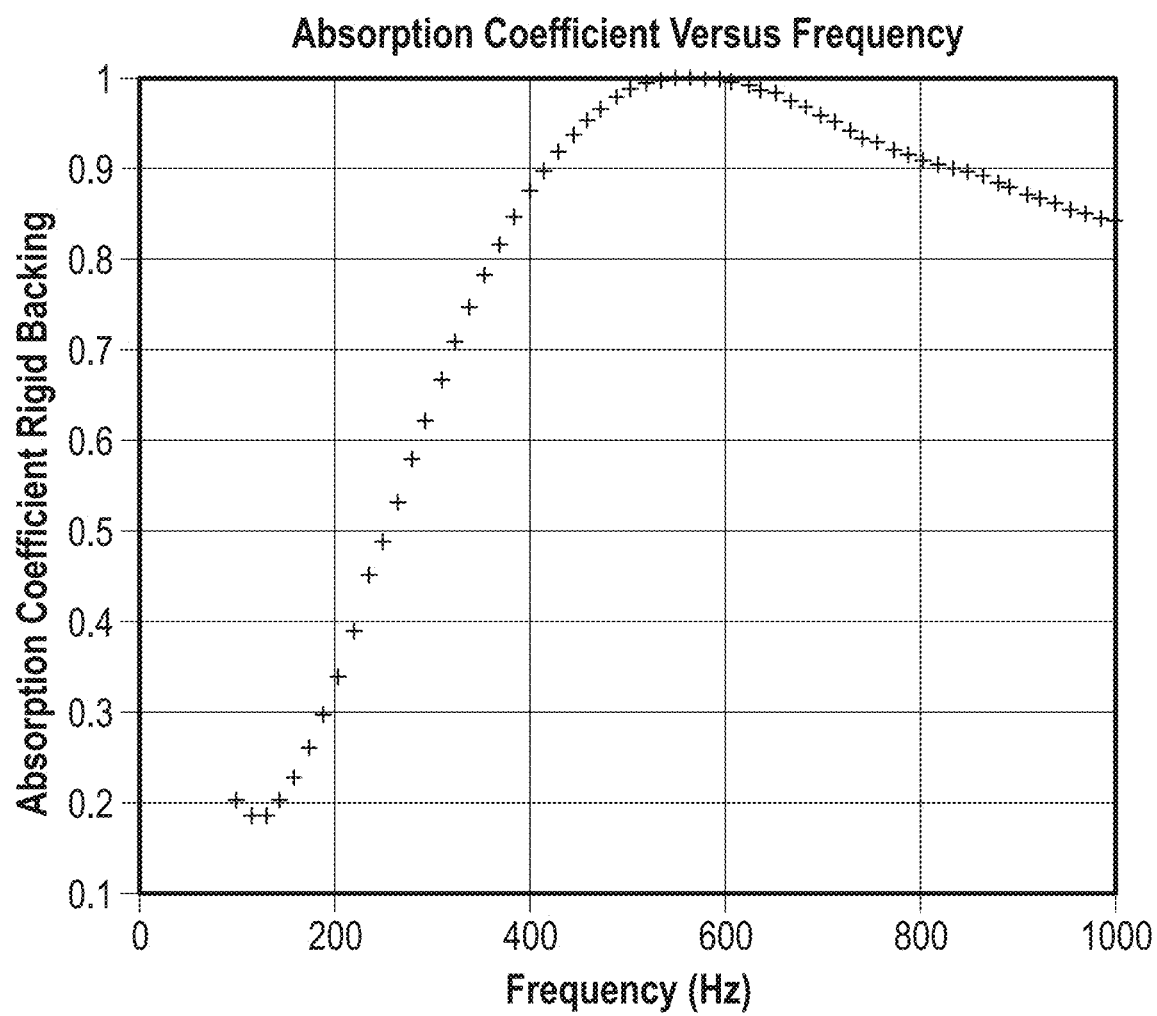
FIG. 5 is a graph representing the evolution of the acoustic absorption coefficient of a first test sample as a function of frequency.
Figure 6:
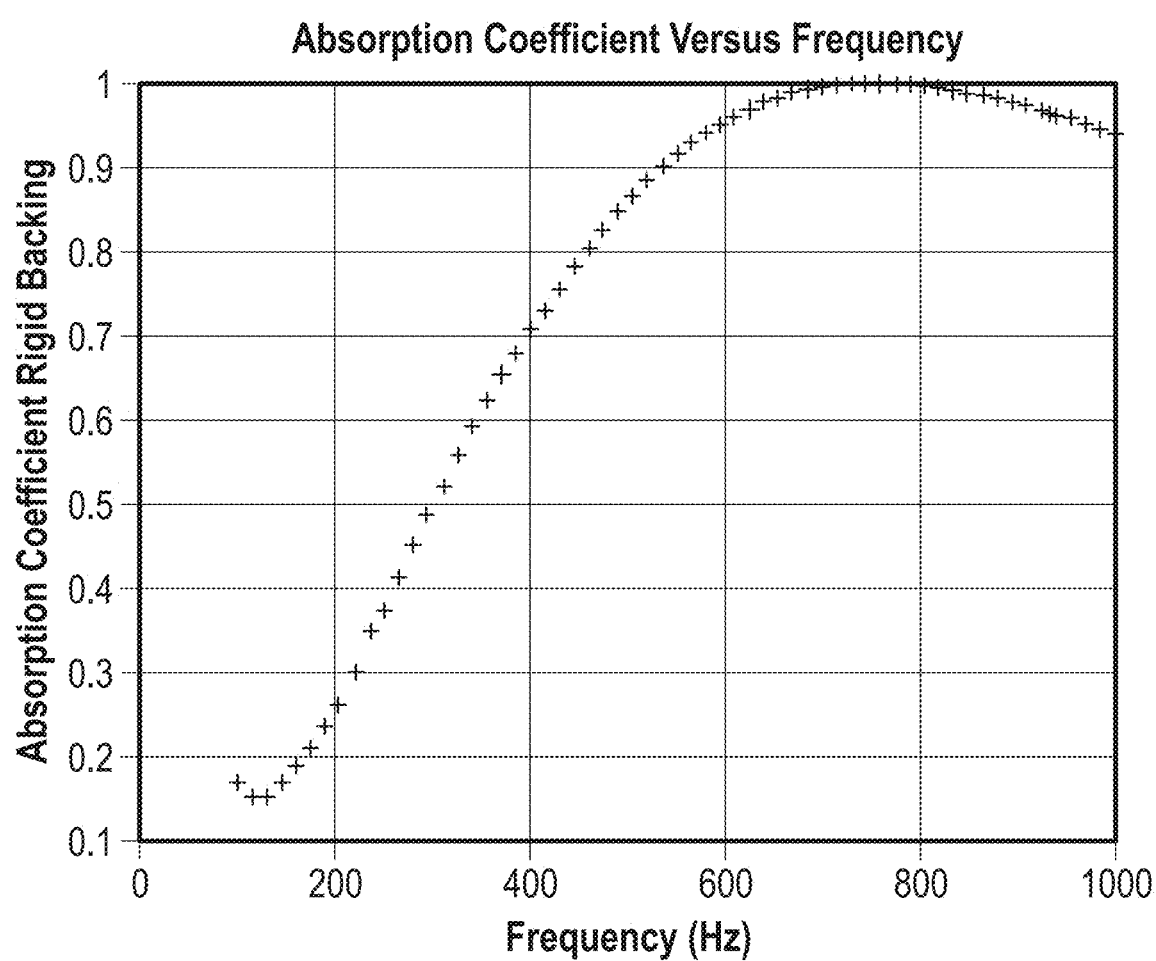
FIG. 6 is a graph representing the evolution of the absorption coefficient of a second test sample as a function of frequency.

Results Obtained after the Kundt's Tube Test in an Acoustic Laboratory:

As illustrated in FIGS. 5 and 6, it should be understood herein that the two products absorb very well frequencies between 400 and 800 Hertz (Hz) with a coefficient higher than 0.9.

Figure 7:
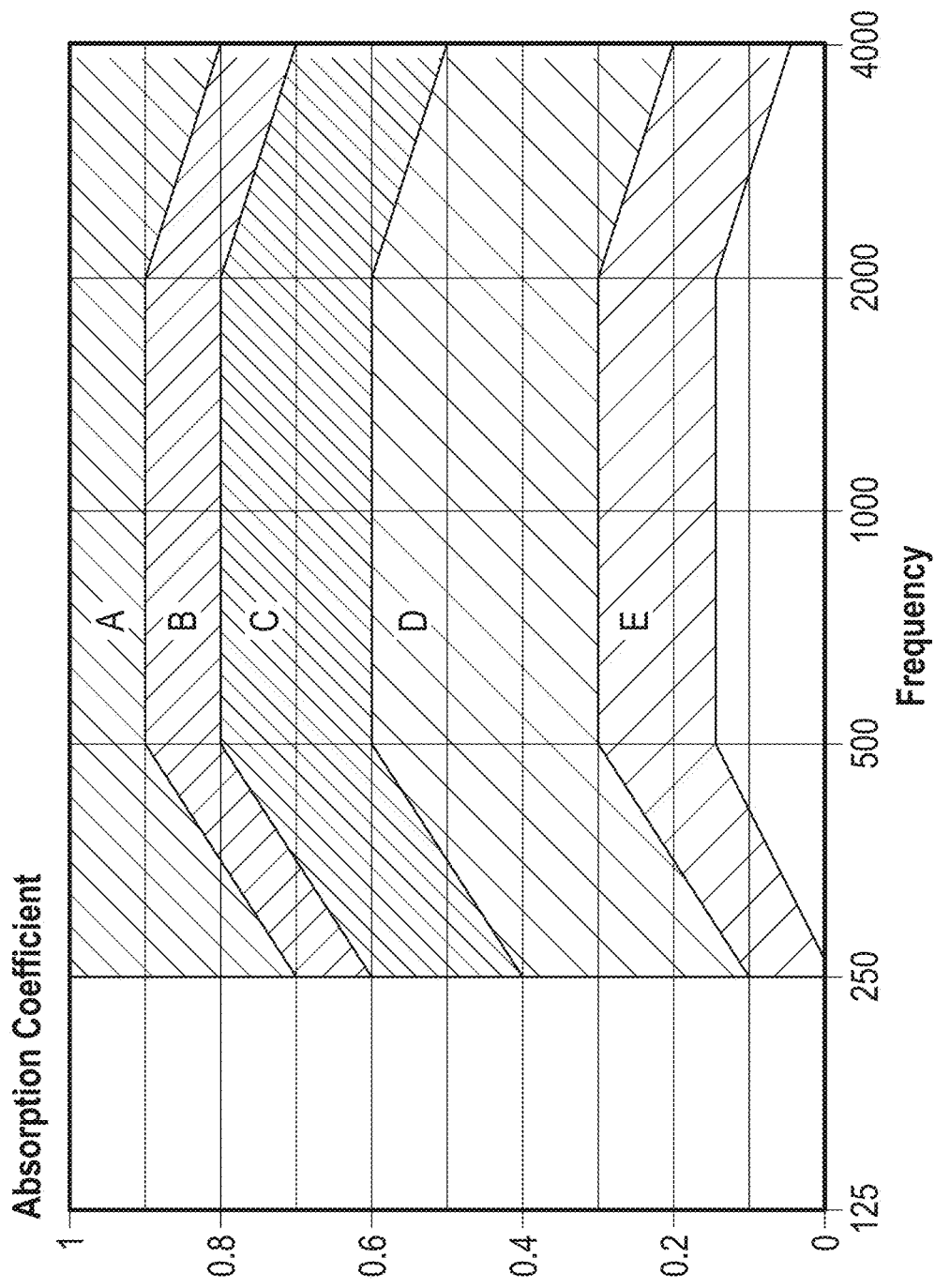
FIG. 7 is a graphical representation allowing classifying the acoustic absorption coefficient as a function of frequency.

Thus, it is possible to set out a classification of the absorbency of the products as a function of frequency as illustrated in FIG. 7.

Starting from 500 Hz, the coefficient remains above 0.85: i.e. in the best class of insulation, the A class. These classes are defined by the EN ISO 354 standard. This absorbent material allows reducing reverberation and therefore preventing noise from propagating.

Attenuation index: Expressed in decibels (dB), this is the standardised measurement characterising the attenuation index of a building material or product. It represents the amount of noise stopped by this material or product. A material is even more insulating as its index (Rw) is high.

Figure 8:
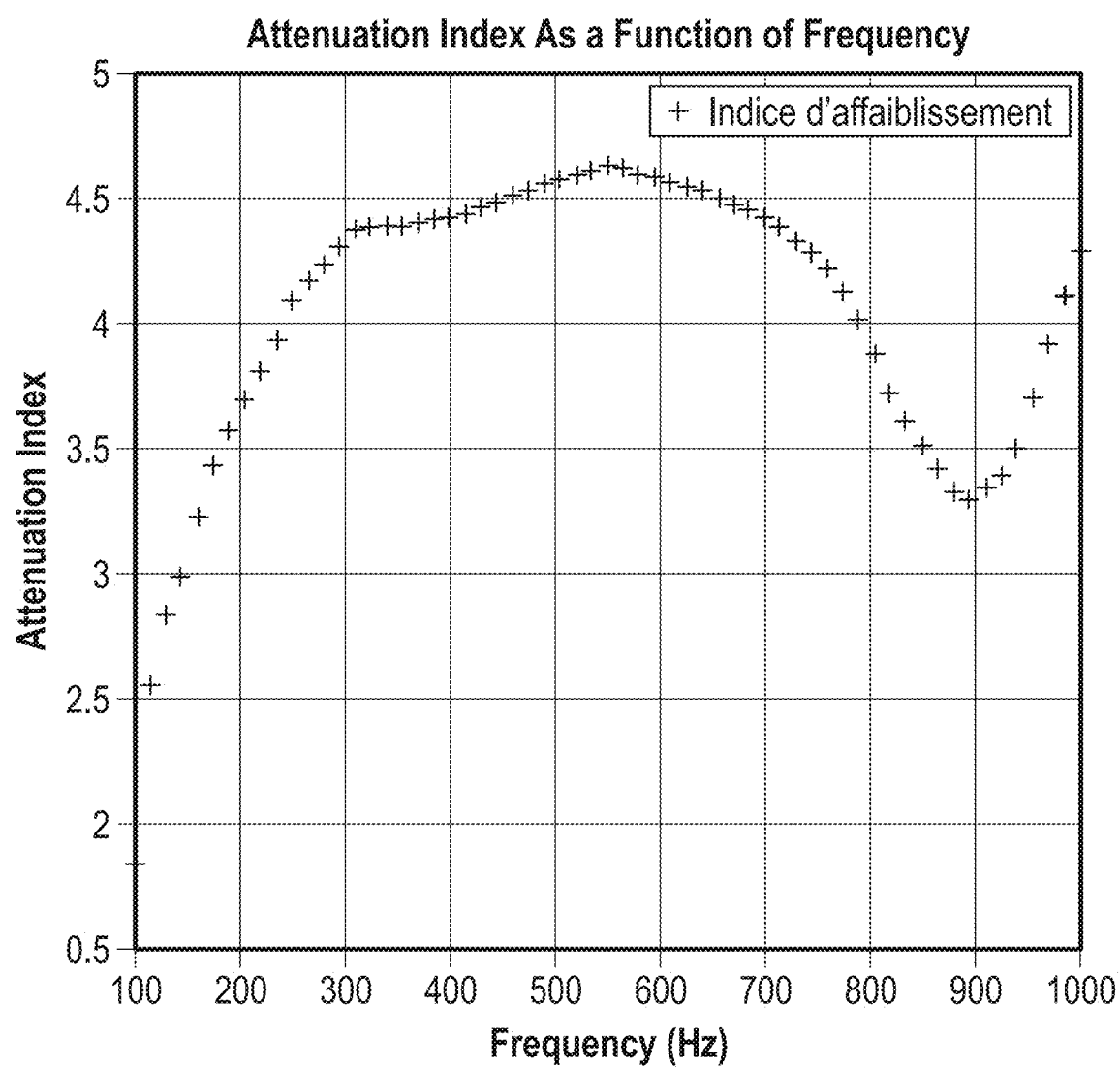
FIG. 8 is a graph representing the evolution of the attenuation index of the bulk product as a function of frequency.
Figure 9:
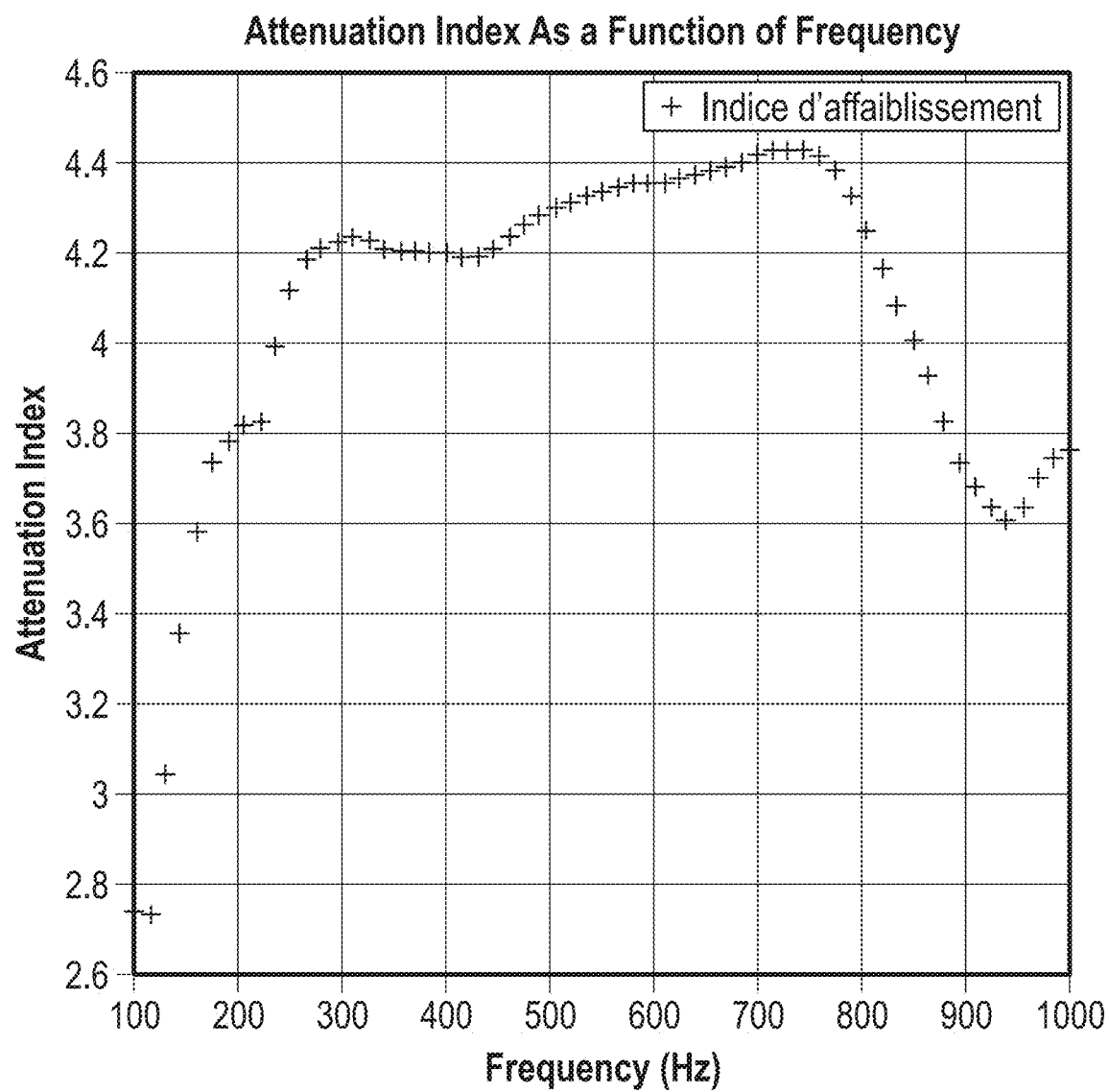
FIG. 9 is a graph representing the evolution of the attenuation index for the lined plate as a function of frequency.

The results obtained after the Kundt's tube test in an acoustic laboratory are illustrated in FIGS. 8 and 9.

Evolution of the Absorption Coefficient According to the Frequency and the Used Material:

TABLE 9

| | Frequency | | | | |
|---|---|---|---|---|---|
| Material | 125 Hz | 250 Hz | 500 Hz | 750 Hz | 1,000 Hz |
| 1 grinding bulk | 0.17 | 0.61 | 0.99 | 0.95 | 0.84 |
| 1 grinding plate | 0.7 | 0.14 | 0.17 | 0.27 | 0.41 |
| 1 grinding lined plate | 0.16 | 0.5 | 0.89 | 1 | 0.94 |
| 1 grinding lined plate (test 2) | 0.16 | 0.5 | 0.89 | 1 | 0.94 |
| Melamine foam (for comparison) | 0.32 | 0.57 | 0.99 | 0.98 | 0.94 |

Evolution of the Attenuation Index According to the Material and the Frequency:

TABLE 10

| | Frequency | | | | |
|---|---|---|---|---|---|
| Material | 125 Hz | 250 Hz | 500 Hz | 750 Hz | 1,000 Hz |
| 1 grinding bulk | 2.7 | 4.25 | 4.6 | 4.8 | 5.2 |
| 1 grinding plate | 0.4 | 1.1 | 0.7 | 0.5 | −0.6 |
| 1 grinding lined plate | 3.3 | 4.1 | 4.3 | 4.4 | 3.7 |
| 1 grinding lined plate (test 2) | 3.3 | 4.1 | 4.3 | 4.4 | 3.7 |
| Melamine foam (for comparison) | 0.71 | 8.1 | 6 | 5 | 7 |

Through this information, we can conclude that the bulk as well as the lined plates are very effective and approach the characteristics of the melamine foam used for an anechoic chamber (experimental room whose walls absorb sound or electromagnetic waves).

To conclude on the effectiveness of the characteristics of this recycled material, we notice that the material derived from the recycled cigarette butts that we have studied has interesting characteristics to be exploited in multiple fields, in particular for insulation.

It should be pointed out that this detailed description covers several particular embodiments of the present invention, yet in no case does this description limit the subject matter of the invention; on the contrary, it aims to take away any possible inaccuracy or any misinterpretation of the following claims.

What is claimed is:

1. A method for cleaning smoked cigarette butts comprising:
    treating the smoked cigarette butts to extract cellulose acetate fibres to be depolluted;

depolluting the cellulose acetate fibres by bringing them into contact with a supercritical fluid, a pressurised dense fluid in a supercritical state; and adding an extractant to the pressurised dense fluid to extract targeted and undesirable substances from the cellulose acetate fibres.

2. The method according to claim 1, wherein the pressurised dense fluid is compressed up to a determined a supercritical pressure and is heated up to a determined supercritical temperature, said supercritical pressure and temperature being determined according to said fluid.

3. The method according to claim 2, wherein said supercritical temperature is between 0° and 400° Celsius, and said supercritical pressure is between 50 and 350 bars.

4. The method according to claim 1, wherein said pressurised dense fluid is one selected from a group consisting of carbon dioxide, methanol, ethanol, water, Tetrafluoroethane, light alkanes having 1 to 5 carbon atoms, ethylene and propylene.

5. The method according to claim 2, wherein said pressurised dense fluid is carbon dioxide and wherein said supercritical temperature is higher than or equal to 31° Celsius and said supercritical pressure is higher than or equal to 73.85 bars.

6. The method according to claim 1, further comprising adding a co-solvent to said pressurised dense fluid to extract organic substances from said cellulose acetate fibres.

7. The method according to claim 6, wherein the co-solvent is at least one selected from a group consisting of water, aliphatic alcohols with 1 to 5 atoms, aqueous solutions, terpenes, benzene, cyclohexanes, ketones, and hydrofluoroethers.

8. The method according to claim 1, wherein the depollution further comprises, humidifying the cellulose acetate fibres prior to bringing into contact with the pressurised dense fluid.

9. The method according to claim 8, wherein bringing into contact with the pressurised dense fluid comprises jetting of said fluid in a direction of said cellulose acetate fibres.

10. The method according to claim 8, wherein bringing into contact with the pressurised dense fluid is carried out for a period between one minute and eight hours.

11. The method according to claim 1, wherein the treating comprises grinding of said cigarette butts.

12. The method according to claim 11, further comprising, following the grinding, sieving in order to separate the cellulose acetate fibres from leaves, ashes and/or tobaccos.

13. The method according to claim 1, wherein the targeted and undesirable substances are inorganic substances and wherein the extractant comprises a solution of agents capable of extracting any of the inorganic substances.

14. The method according to claim 13, wherein the extractant is one selected from a group consisting of complexants, chelating agents and antioxidants.

* * * * *